United States Patent
Greene et al.

(10) Patent No.: US 9,573,546 B2
(45) Date of Patent: Feb. 21, 2017

(54) ARMORED GULLWING DOOR

(71) Applicant: Spintek Filtration, Inc., Los Alamitos, CA (US)

(72) Inventors: William Greene, Long Beach, CA (US); Jason Gilmour, Fountain Valley, CA (US)

(73) Assignee: Spintek Filtration, Inc., Los Alamitos, CA (US)

( * ) Notice: Subject to any disclaimer, the term of this patent is extended or adjusted under 35 U.S.C. 154(b) by 15 days.

(21) Appl. No.: 14/672,320

(22) Filed: Mar. 30, 2015

(65) Prior Publication Data

US 2016/0288753 A1     Oct. 6, 2016

(51) Int. Cl.
*B60R 21/12*     (2006.01)
*B60J 5/04*     (2006.01)

(52) U.S. Cl.
CPC .............. *B60R 21/12* (2013.01); *B60J 5/045* (2013.01); *B60J 5/0473* (2013.01)

(58) Field of Classification Search
CPC .......... B60R 21/12; B60J 5/0473; B60J 5/045
USPC ...... 296/146.2, 187.07, 200; 89/36.08, 36.09
See application file for complete search history.

(56) References Cited

U.S. PATENT DOCUMENTS

| | | | |
|---|---|---|---|
| 3,923,339 A * | 12/1975 | McDonald | B60R 21/12 160/370.21 |
| 4,316,404 A | 2/1982 | Medlin | |
| 4,441,754 A * | 4/1984 | Hantel | B60J 5/108 296/51 |
| 5,271,311 A | 12/1993 | Madden, Jr. | |
| 5,531,500 A * | 7/1996 | Podvin | F41H 5/0478 109/49.5 |
| 5,660,021 A | 8/1997 | Wolgamot et al. | |
| 7,322,636 B1 * | 1/2008 | Woodhouse | B60J 5/0473 296/146.1 |
| 7,533,600 B2 * | 5/2009 | Marqueling | F41H 5/16 89/36.09 |
| 2007/0126260 A1 * | 6/2007 | Geyrhofer | B60J 5/047 296/146.12 |
| 2011/0186577 A1 * | 8/2011 | Limbert | F16J 15/16 220/378 |
| 2013/0213278 A1 * | 8/2013 | Kuisis | F41H 5/26 109/58.5 |

FOREIGN PATENT DOCUMENTS

JP     2002-178762     6/2002
JP     2002178762 A *     6/2002

* cited by examiner

*Primary Examiner* — Jason S Morrow
*Assistant Examiner* — E Turner Hicks
(74) *Attorney, Agent, or Firm* — Carmody Torrance Sandak & Hennessey LLP

(57) ABSTRACT

A gullwing door that is mountable to a vehicle and that is capable of providing ballistics protection to occupants of the vehicle. The gullwing door includes an outer panel that is rotatably mountable to the vehicle at an upper edge of the outer panel and that is lined with a first protective shell, and an inner panel disposed adjacent to the outer panel that comprises a second protective shell. The inner panel is rotatably connected to the outer panel at an upper edge of the inner panel and the inner panel and the outer panel are capable of rotatably opening together or separately.

17 Claims, 8 Drawing Sheets

ARMORED GULLWING DOOR

FIELD OF THE INVENTION

The present invention relates generally to an armorized gullwing door to protect occupants of a vehicle.

BACKGROUND OF THE INVENTION

Many handguns are capable of firing a bullet that can readily pass through the outer sheet metal and the inner decorative fabric covering the doors of a typical automobile and with sufficient momentum to injure or kill an individual who happens to be in the path of travel of that bullet. Thus, from a standpoint of safety, especially in areas of political unrest and in other volatile environments, it may be desirable to provide some level of armor or ballistic protection to protect occupants of the vehicle from weapons fire, fragmentation caused by explosions and other harm.

As is well known in the art, specially modified armored vehicles can be used to protect vehicle occupants from attack by weapons fire and/or fragmentation caused by explosions. These vehicles are typically utilized by police forces and other emergency services, such as fire and ambulance, which may come under attack, by military and peace keeping forces, and by those involved in security operations and charity work in volatile areas of the world. In addition, these vehicles may also be used by diplomats, politicians and other noteworthy and/or famous people worldwide to protect against kidnapping and/or assassination attempts, as well as other persons who may fear for their safety and desire protection from attacks.

U.S. Pat. No. 5,271,311 to Madden, Jr., the subject matter of which is herein incorporated by reference in its entirety, describes a removable bulletproof apparatus for a vehicle which includes a transparent panel that is secured to or disposed adjacent to a vehicle window and a flexible curtain that is secure to a bracket to which the bottom portion of the transparent panel is secured. The curtain may include a bottom flap or portion that may be pivoted down when the door is open to provide an essentially full length bulletproof shield.

In addition, U.S. Pat. No. 5,531,500 to Podvin, the subject matter of which is herein incorporated by reference in its entirety describes a bullet-proofing panel for attachment to the exterior door surface of an automobile comprising an outer polymeric skin having a contour corresponding to the contour of the sheet metal of the vehicle's door. The polymeric skin member defines a predetermined space or pocket therebetween which contains a barrier member capable of stopping bullets.

However, while various armoring or bullet-proofing arrangements have been developed for vehicles utilizing conventional doors, there remains a need in the art for an improved armoring and/or bullet-proofing apparatus for vehicles that utilize gullwing doors.

Gull-wing doors are doors that are hinged at the roof of the vehicle and thus open out and up. Similarly, scissor doors are typically hinged on the front pillar of the vehicle and also open in upward motion. On both gull-wing and scissor doors, the opening process is typically supported by pressurized cylinders so that the door does not close under its own weight.

Examples of automobiles with gull-wing doors including the 1950s Mercedes Benz 300SL and the 1980s DeLorean DMC-12. More recently, the Mercedes Benz SLS AMG and the Tesla Model X have also incorporated gullwing doors.

A typical gull-wing door has a one piece configuration that is hinged at the roof, as described, for example, in U.S. Pat. No. 4,378,658 to DeLorean, the subject matter of which is herein incorporated by reference in its entirety. The use of articulated gull-wing doors has also been suggested and examples of articulated gull-wing doors can be found, for example, in U.S. Pat. No. 5,992,918 to Hoffman, and in U.S. Pat. No. 8,449,015 to Brown et al., the subject matter of each of which is herein incorporated by reference in its entirety. In addition, DE 10200502133A1 to Volkswagen describes a vehicle door, including a gull-wing door, that is of a telescopic form and in which the lower region of the door is able to slide over the upper part of the door. An advantage of gull-wing doors is that when properly designed, they allow much better entrance/egress than conventional doors, thus more easily facilitating access for passengers as well as storage of wheelchairs and cargo.

One of the most common methods of armoring a vehicle is by adding steel plates where opaque armor is appropriate and adding laminated transparent armor within the window frames. However, because of the size and hinge design of gullwing doors, the addition of a steel plate, of sufficient thickness to withstand weapons fire, to the gullwing door can increase the weight of the door beyond the capabilities of the door open/close hinge mechanism. In addition, while there are many benefits to the large opening afforded by the gullwing door configuration with respect to entrance and egress of individuals into and out of the vehicle, when it comes to security, especially in a potentially hostile environment, the large door opening can also be a substantial safety liability.

Thus, it would be desirable to provide an improved design for a gullwing door that takes advantage of the unique configuration of large opening of the gullwing door while at the same time improving upon the significant deficiencies of the door design in terms of both weight and security.

SUMMARY OF THE INVENTION

It is an object of the present invention to provide a gullwing door.

It is another object of the present invention to provide an armorized gullwing door.

It is another object of the present invention to provide an armorized gullwing door that is mountable in a vehicle.

It is another object of the present invention to provide an armorized gullwing door that can protect occupants in the vehicle from weapons fire.

It is still another object of the present invention to provide an armorized gullwing door that provides enhanced protection to occupants entering and exiting the vehicle.

To that end, in one embodiment, the present invention relates generally to a gullwing door that is mountable to a vehicle, wherein the gullwing door comprises:

an outer panel, wherein the outer panel rotatably mountable to the vehicle at an upper edge of the outer panel, wherein the outer panel is lined with a first protective shell; and an inner panel disposed adjacent to the outer panel, wherein the inner panel comprises a second protective shell;

wherein the inner panel is rotatably connected to the outer panel at an upper edge of the inner panel;

wherein the inner panel and the outer panel are capable of rotatably opening together or separately.

BRIEF DESCRIPTION OF THE FIGURES

For a fuller understanding of the invention, reference is had to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

The present invention relates generally to an improved gullwing door that is capable of providing ballistics protection to occupants in a vehicle and that is capable of better protecting occupants as they enter and/or exit such vehicle, especially in hostile or unsafe areas.

More specifically, and as illustrated in FIGS. 1-8, the present invention relates generally to a gullwing door that is mountable to a vehicle, wherein the gullwing door comprises:

an outer panel 2, wherein the outer panel 2 is rotatably mountable to the vehicle at an upper edge of the outer panel 2, wherein the outer panel 2 is lined with a first protective shell 6; and an inner panel 4 disposed adjacent to the outer panel 2, wherein the inner panel 4 comprises a second protective shell 8;

wherein the inner panel 4 is rotatably connected to the outer panel 2 at an upper edge of the inner panel 4;

wherein the inner panel 4 and the outer panel 2 are capable of rotatably opening together or separately.

Figure 1:
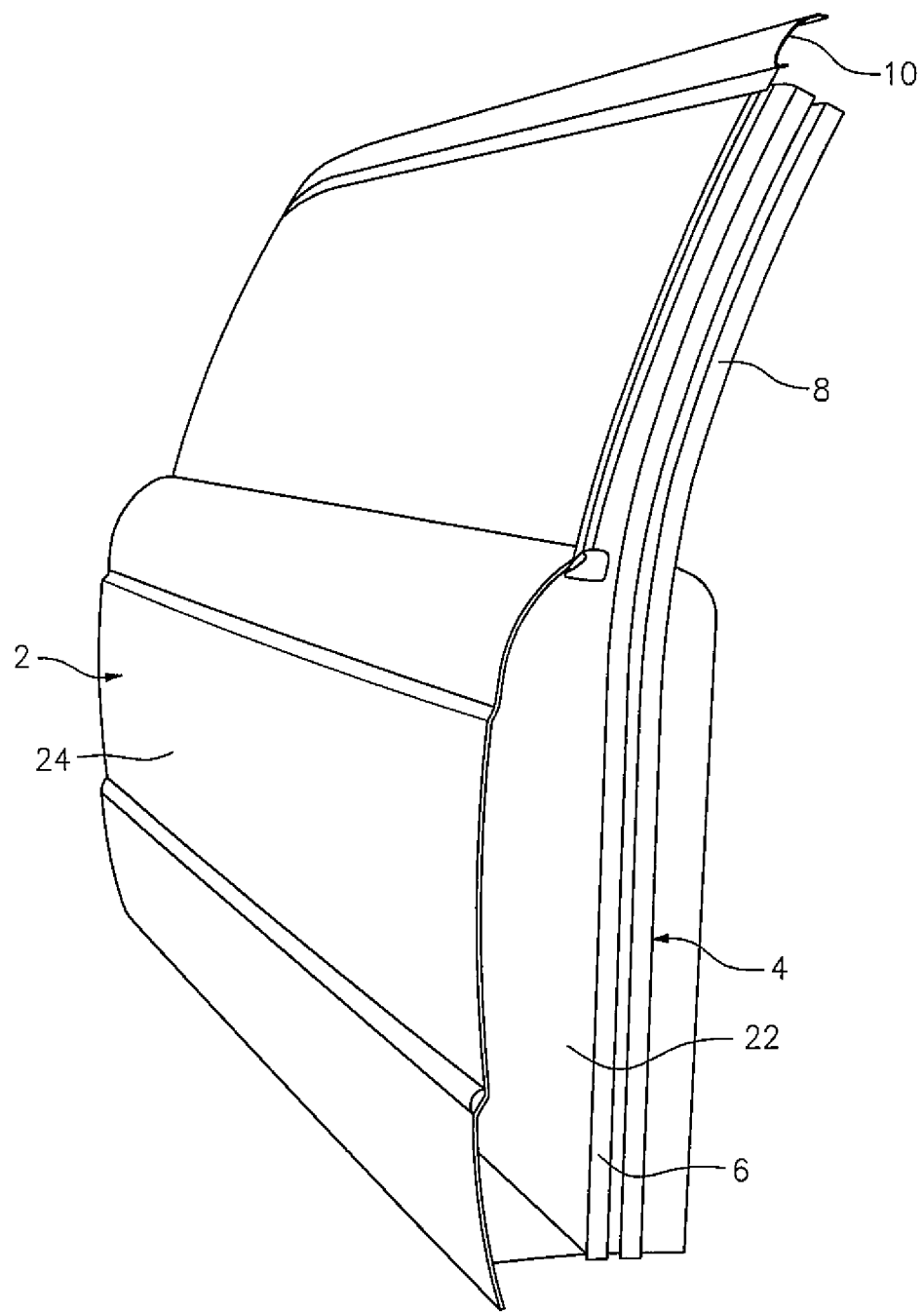
FIG. 1 depicts a first view of a gullwing door in accordance with the present invention in which the outer panel and inner panel are both in a closed position.
Figure 2:
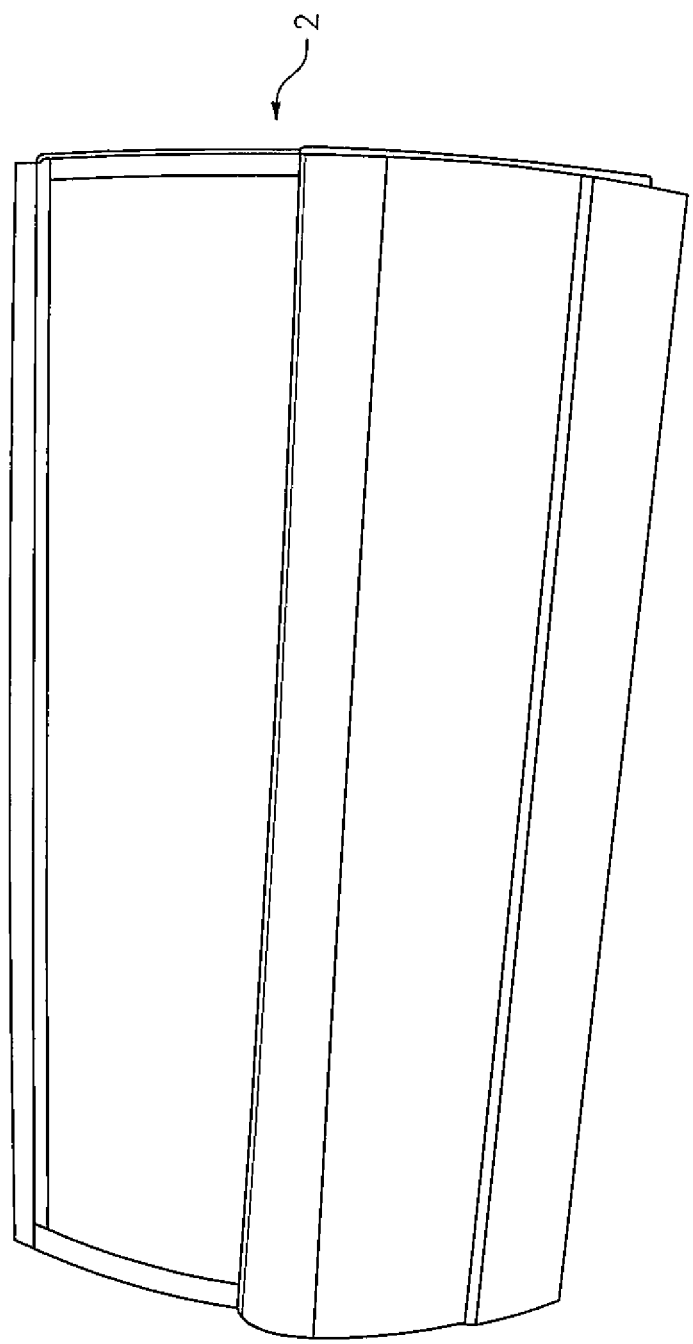
FIG. 2 depicts another view of the gullwing door in accordance with the present invention in which the outer panel and inner panel are both in a closed position as seen from the outer panel.
Figure 3:
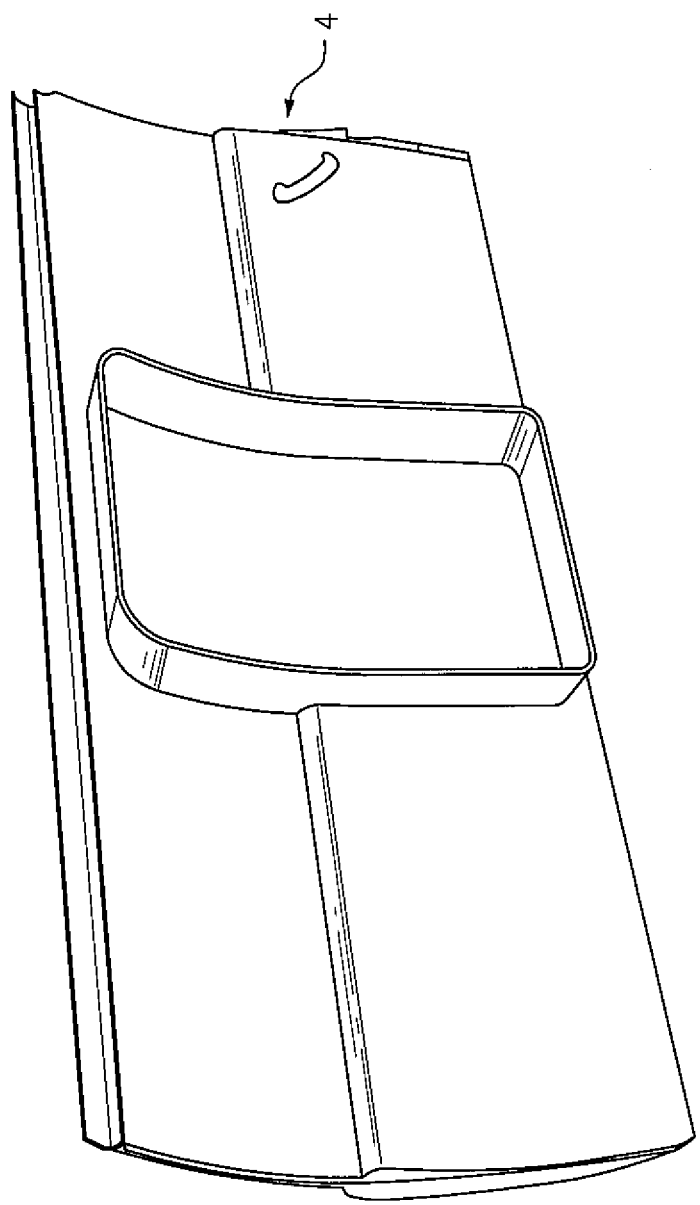
FIG. 3 depicts another view of the gullwing door in accordance with the present invention in which the outer panel and inner panel are both in a closed position as seen from the inner panel.

As best seen in FIG. 1, the outer panel 2 and the inner panel 4 of the gullwing door generally have at least substantially the same length and width dimensions. By at least substantially what is meant is that the width of the outer panel 2 and the width of the inner panel 4 as measured across the width of the gullwing door are generally the same. In addition, the length of the outer panel 2 and the length of the inner panel 4, as measured from the top to the bottom of the first protective panel 6 and the second protective panel 8, are also generally the same.

The outer panel 2 comprises a flat seal interface 10 capable of providing a leak proof seal with a corresponding seal in a modular frame of the vehicle when the door is in a closed position. The outer panel 2 also comprises a mechanism, such as one or more hinges, for rotatably mounting the outer panel 2 to the vehicle so that the gullwing door can be opened and closed.

Figure 4:
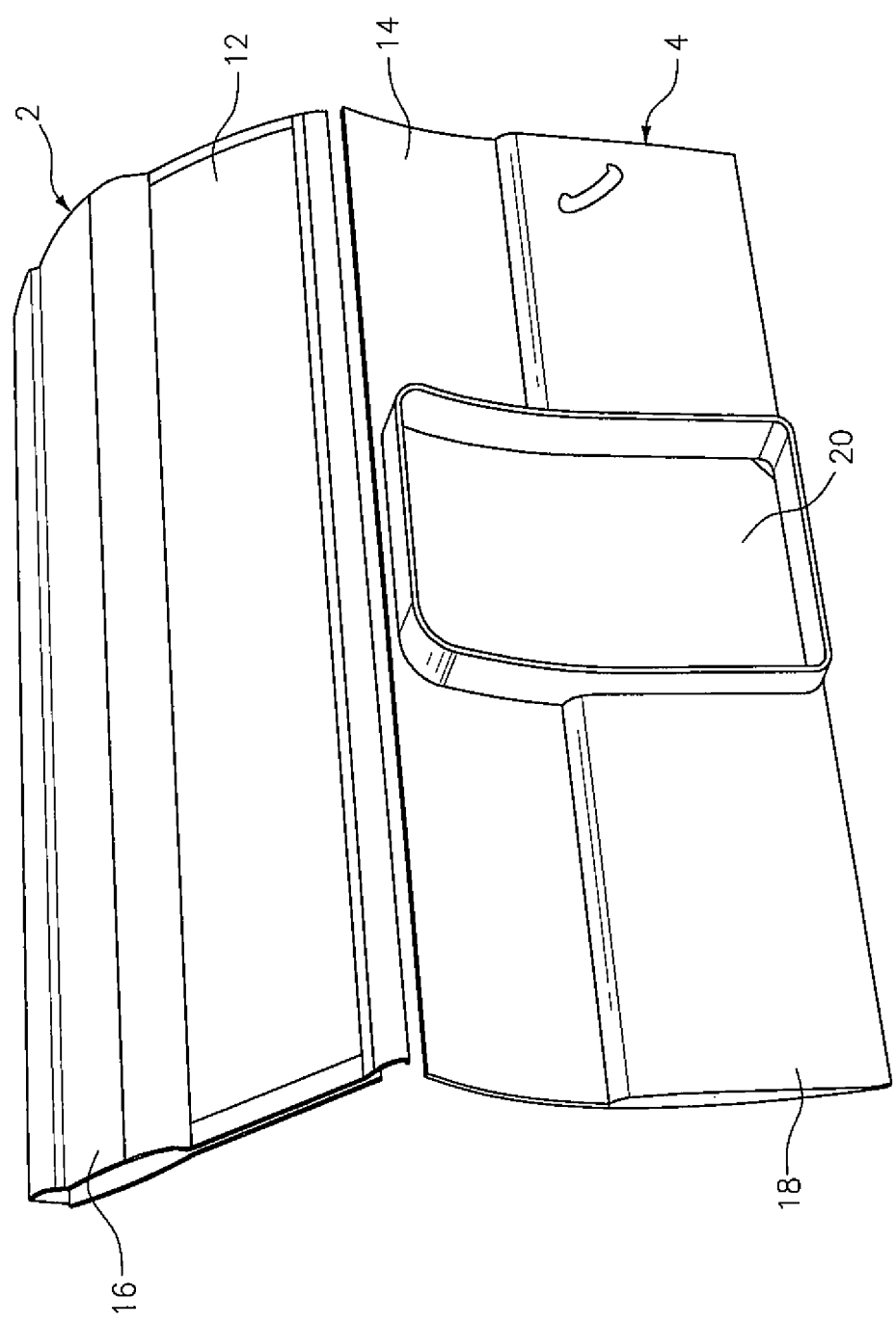
FIG. 4 depicts a view of the gullwing door in accordance with the present invention in which the outer panel is in an open position and the inner portion is in the closed position.

As best seen in FIG. 4, the gullwing door is preferably configured so that the outer panel 2 and the inner panel 4 each comprise a transparent window portion 12 and 14 and an opaque portion 16 and 18. The transparent window portion 12 and the opaque portion 16 of the outer panel 2 and transparent window portion 14 and opaque portion 18 of the inner panel 4 are generally in alignment with each other.

If desired, at least one of the transparent window portion 12 of the outer panel 2 or the transparent window portion 14 of the inner panel 4 may be capable of moving up and down within a frame of the opaque portion 16 of the outer panel 2 or the opaque portion 18 of the inner panel 18 respectively so that the window may be raised and lowered to allow air into vehicle. However, it is noted that this is an optional feature as it is contemplated that is many configuration due to safety consideration, it would desirable for the window to be in a fixed position so that it may not be lowered.

In another embodiment, at least one of the outer panel 2 and the inner panel 4 does not comprise transparent window portion 12 or 14. Thus, it is contemplated, for example, that substantially the entirety of the inner panel 4 may be composed of a bullet resistant material as described above. In addition, if desired, one or more wide angle cameras (not shown) may be mounted on or adjacent to the first protective shell 6 and/or at other areas around the vehicle, so that one or more outside views of the area surrounding the vehicle can be shown on video screens in the interior of the vehicle.

Figure 5:
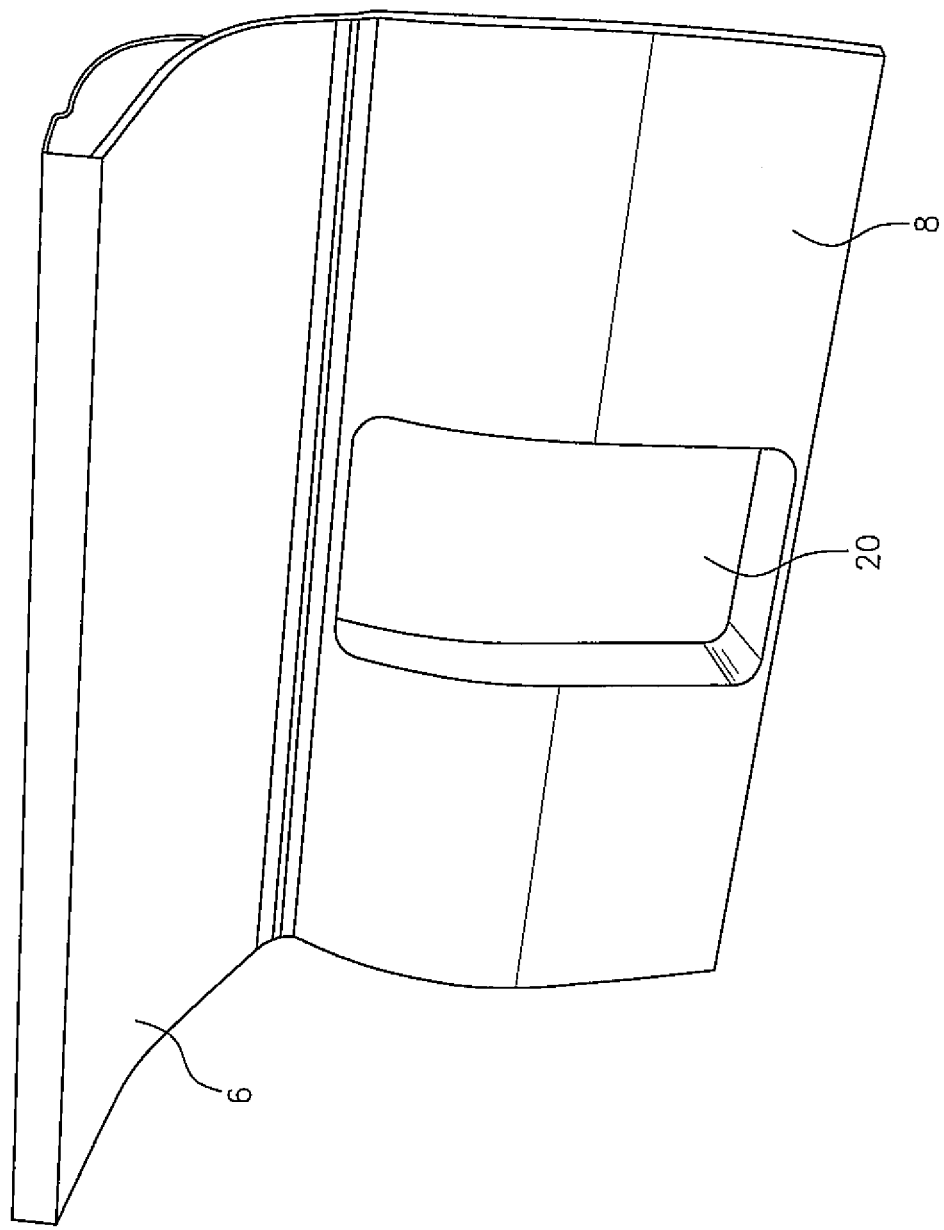
FIG. 5 depicts another view of the gullwing door in accordance with the present invention in which the outer panel is in an open position and the inner portion is in the closed position
Figure 6:
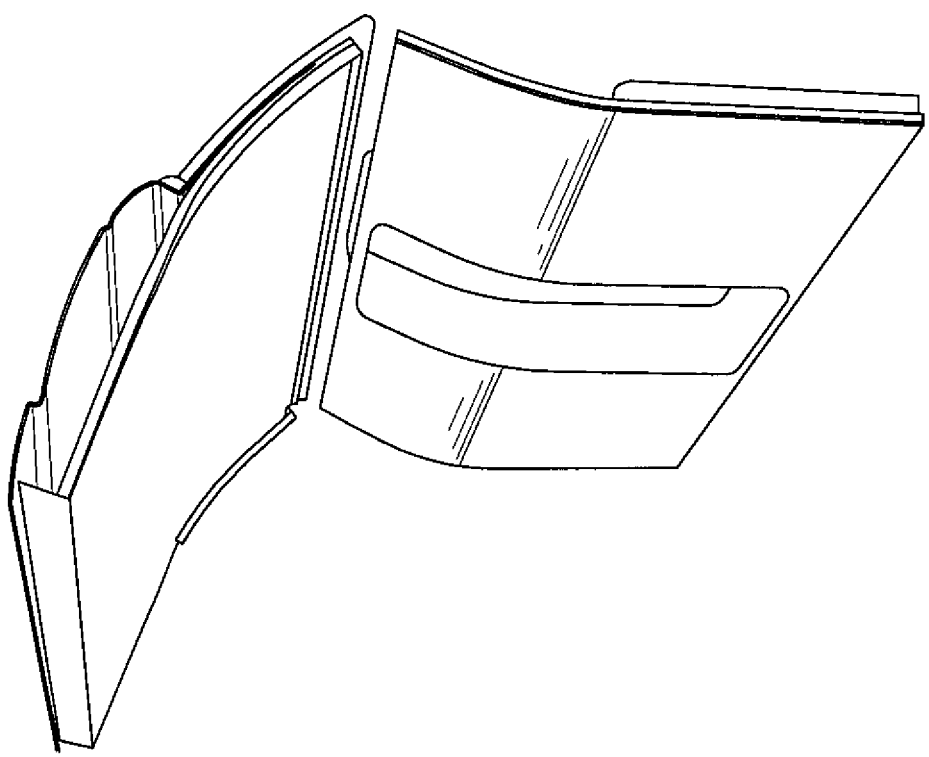
FIG. 6 depicts a side view of the gullwing door in accordance with the present invention in which the outer panel is in an open position and the inner portion is in the closed position
Figure 7:
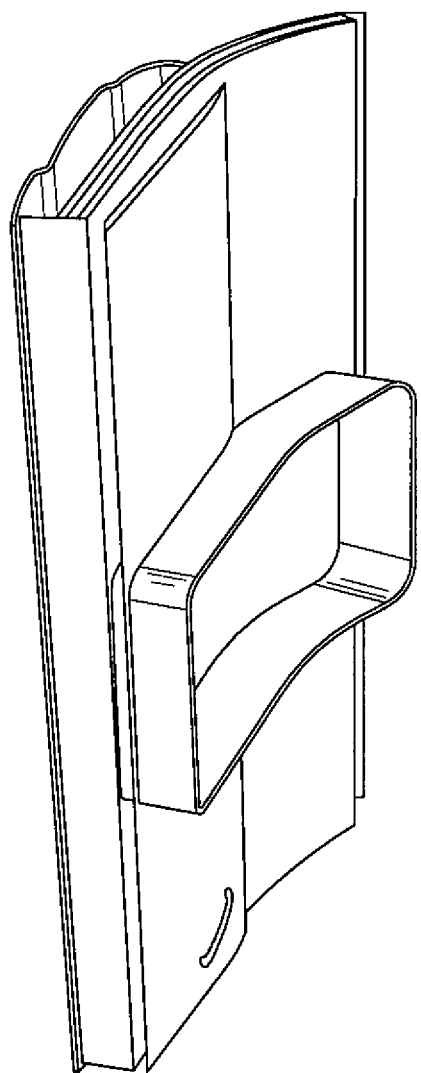
FIG. 7 depicts a view of the gullwing door in accordance with the present invention in which both the outer panel and the inner panel are in the open position.
Figure 8:
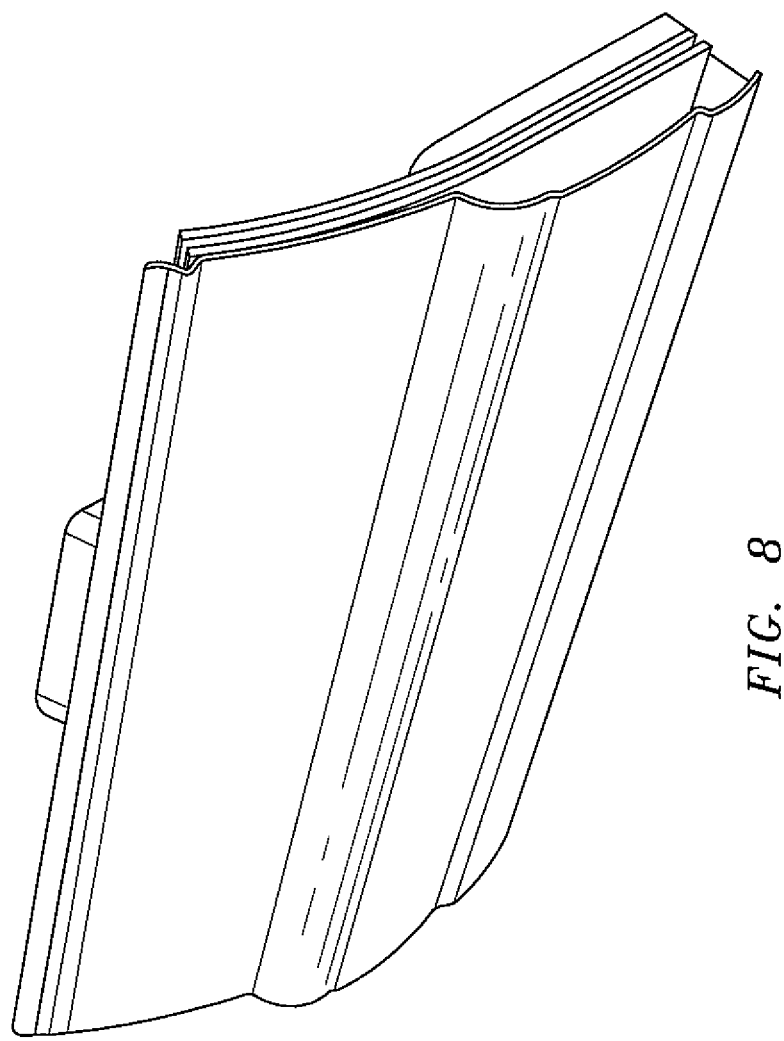
FIG. 8 depicts another view of the gullwing door in accordance with the present invention in which both the outer panel and the inner panel are in the open position.

In one preferred embodiment of the invention and as best illustrated in FIGS. 3-7, the inner panel 4 of the gullwing door comprises an opening 20 disposed therein to allow an occupant to enter or exit the vehicle when the inner panel 4 is in a closed position and the outer panel 2 is in an open position as shown in FIGS. 4-6. As described herein, one of the novel features of the present invention is that the gullwing door is configured in two separate pieces, the inner panel 4 and the outer panel 2. If conditions outside of the vehicle are generally safe for the occupants of the vehicle to exit, both the inner panel 4 and the outer panel 2 can be opened together to allow the occupants to exit, as illustrated in FIGS. 7 and 8. However, if conditions outside the vehicle are hostile or unsafe, the inner panel 4 of the gullwing door can remain down (i.e., in a closed position) to continue to protect occupants in the vehicle from at least most threats from outside the vehicle as only the opening 20 within the inner panel 4 is open into the vehicle. In this instance, an occupant can enter or exit from within this much smaller opening, thus increasing security within the vehicle even during entrance and egress.

As described herein, the inner panel 4 is rotatably connected to the outer panel 2 at a top of the first protective shell 6 and the second protective shell 8. In one embodiment, the inner panel 4 and outer panel 2 are rotatably connected by a plurality of hinges. Other means of rotatably connecting the inner panel 4 and the outer panel 2 would also be known to those skilled in the art. Furthermore, due to the weight of the gullwing door in accordance with the present invention, movement of the gullwing door from open to close and vice versa, whether both panels together or separately, is controlled by one or more electric motors.

For example, one occupant of the vehicle may be a bodyguard, who may first exit the vehicle to assess the threat level to other occupants within the vehicle and determine whether the gullwing door should be opened in a "normal mode" in which the threat level is minimal and both in the inner panel 4 and outer panel 2 of the gullwing door are opened together or, alternatively opened in a "safe mode," in which conditions may be threatening and the inner panel 4 should remain down and closed while only the outer panel 2 is opened. In addition, in the safe mode, because both the inner panel 4 and the outer panel 2 comprise a bullet resistant material, the outer panel 2 in an open position comprises an "awning" of bullet resistant material in that the outer panel 2 in an open position provides protection and cover from attacks/threats from the air or other positions in which an attacker is at a vantage point that looks down on the vehicle. Thus, in the safe mode, an occupant exiting the vehicle has protection from the side and from above.

Finally, as best seen in FIG. 4, in one embodiment, the inner panel 4 further comprises a ring 21 surrounding opening 20 and extending inward from the inner panel 4. Because this ring 21 extends inward, it decreases the shot angle available for a shot being fired into the car when the outer panel 2 is open. This ring 21 also comprises bullet resistant material and is able to absorb a fired shot so that it does not ricochet into the vehicle. The ring may be extension or lip of inner panel 4 such that inner panel 4 is a one-piece construction that extends to include ring 21. In the alternative, ring 21 may be connected to the opening 20 of inner panel 4 by welding or other means to securely fasten ring 21 to the opening 20.

Optionally, but preferably, the inner panel 4 of the gullwing door may also comprise a removable protective piece capable of filling or seal the opening in the inner panel 4 when the opening 20 is not in use. Thus the opening 20 of the inner panel 4 may be removably filled or sealed when the gullwing door is operated in its normal mode, and both the inner panel 4 and outer panel 2 are opened simultaneously, or when the gullwing door is closed, and both the inner panel 4 and outer panel 2 are in a closed position.

The first protective shell 6 and the second protective shell 8 of the gullwing door each preferably comprise a corrosion-resistant steel alloy, a composite material, or another similar material that is capable of at least substantially withstanding weapons fire and/or fragmentation caused by explosion. By at least substantially, what is meant is that the material is bullet resistant against most weapons fire and fragmentation from explosions although it may not be 100% effective. Thus, it is desirable that the material prevent most, if not all, weapons fire. In addition, at least one of the first protective shell 6 and the second protective shell 8 may also comprise a ballistic fiberglass or fabric liner to provide additional protection against weapons fire and fragmentation. Thus, the pocket or space 22 between an outer shell 24 of the outer panel 2 and the first protective shell 6 may be filled with a suitable bullet resistant material, such as a woven KEVLAR® aramid fiber material or ballistic nylon. Other suitable bullet resistant materials can also be used and would be known to those skilled in the art.

If used, the transparent window portion 12 of the outer panel 2 or the transparent window portion 14 of the inner panel 4 of the gullwing door preferably comprise a generally bullet resistant material such as one or more layers of a polycarbonate, which may be sandwiched with other materials. These materials are designed to absorb energy from weapons fire and fragmentation from explosions and exhibit no visible different from normal, factory-installed vehicle windows. For example, the transparent window portion 12 or 14 may comprise a sandwich of polycarbonate and leaded glass. The thickness of the transparent window portion 12 and 14 and its specific structure depends in part on the extent of the protection desired relative to the penetration of the bullets. For example, for relatively low powered bullets, one thickness may be used, while for stopping higher powered bullets, a thicker material would be required. If desired, the transparent window portion 12 and/or 14 may be tinted to hide the passengers from outside view.

In another embodiment, the present invention also relates generally to a vehicle having at least one gullwing door mounted therein, wherein the at least one gullwing door comprises:

an outer panel 2, wherein the outer panel 2 is rotatably mountable in a vehicle at an upper edge of the outer panel 2, wherein the outer panel 2 is lined with a first protective shell 6; and an inner panel 4 disposed adjacent to the outer panel 2, wherein the inner panel 4 comprises a second protective shell 8;

wherein the inner panel 4 is rotatably connected to the outer panel 2 at an upper edge of the inner panel 4;

wherein the inner panel 4 and the outer panel 2 are capable of rotatably opening together or separately.

In addition to the armored gullwing door described herein, other parts of the vehicle can also be protected from weapons fire and fragmentation caused by explosions.

Flat areas of the vehicle, such as the roof or floor, which are not normally subjected to perpendicular penetration by bullets or other weapons fire during attack, can be equipped with multiple layers of one or more of ballistic nylon, Kevlar®, steel plate, and other suitable materials to prevent the reflection of bullets or other projectiles therethrough and to protect against explosions. In addition, the front and rear windshields, other windows, and sunroofs may also be fitted with transparent armor protection.

Furthermore, the fuel tank and the radiator of the vehicle may be protected by wrapping it with ballistic nylon or other ballistic protection to prevent explosion and by providing locking caps to prevent tampering.

If desired the typical acid battery can be replaced with a dry cell or other batteries that are not at risk of exploding and causing damage to the engine or the battery may be encased in a woven rigid polyglass structure or other similar structure or material that can protect the battery from damage.

Because of the increased weight of the armor in the armored car, the suspension, shocks and brakes may also to be modified to accommodate the increased weight and provide acceptable performance. In addition, one or more additional hinges may be required for opening and closing the gullwing door described herein.

Tires can be protected against blow out in several ways. One option is to place ballistic rubberized plastic rings inside each tire; if the tire loses its seal or becomes deflated, the ring, or roller, acts as a backup tire. Another option is to use auto-inflated tires, which have an integrated air pump that keeps the tires inflated in the event that they lose a seal or become deflated, or to use run-flat tires.

The vehicle may also utilize extra structural strength in the bumper to allow the armored car to ram its way out of dangerous situations. The reinforced bumper can also prevent the corner of the bumper from smashing into the tire and rendering the vehicle undriveable.

Ballistic resistance refers to what type of gunfire the armored car is designed to protect against. Ballistic resistance is defined and organized according to levels of protection. There are several internationally recognized standards of ballistic resistance (NIJ, CEN, UL), and many armored car companies have designated their own levels of ballistic resistance that roughly correspond to the internationally recognized standards. The standards measure the caliber, mass, and velocity of the projectile, as well as the distance and angle that it is fired. As an example, the CEN standard begins at level 'B4', which is effective against 22 caliber bullets, and goes all the way up to 'B7', which is effective against armor piercing rounds. Special protection vehicles offer extensive protection against handguns and rifles. However due to the complex nature of vehicles design and contemporary weapon technology, 100% percent protection cannot be guaranteed.

It is understood that the embodiments of the present invention described herein are suitable for vehicles having two doors or four doors. In addition, the gullwing door described herein may be situated on the driver's side and/or the passenger's side of the vehicle. Thus the vehicle may include one or more gullwing doors as described herein. If only a single gullwing door of the type described herein is used, the one or more additional car doors may comprise conventional car doors. However, the armor resistant material will extend throughout the skin of the vehicle.

It is also understood that "inner" refers to the panel that is closest to the passenger compartment of the vehicle; "outer" refers to the panel that is closest to the outside of the vehicle; "front" represents a side of the vehicle to which the vehicle proceeds; "rear" represents a side of the vehicle to which the vehicle goes back; "upper" represents an upper side of the vehicle in a perpendicular direction; and "lower" represents a lower side of the vehicle in a perpendicular direction.

Thus, it can be seen that the armored gullwing door described herein can provide additional protection to occupants of a vehicle while at the same time taking advantage of the unique attributes that the gullwing doors possess over conventional automotive doors.

It should also be understood that the following claims are intended to cover all of the generic and specific features of the invention described herein and all statements of the scope of the invention that as a matter of language might fall there between.

What is claimed is:

1. A gullwing door that is mountable to a vehicle, wherein the gullwing door comprises:
    an outer panel, wherein the outer panel is rotatably mountable to the vehicle at an upper edge of the outer panel, wherein the outer panel is lined with a first protective shell; and
    an inner panel disposed adjacent to the outer panel, wherein the inner panel comprises a second protective shell;
    wherein the inner panel is rotatably connected to the outer panel at an upper edge of the inner panel;
    wherein the inner panel and the outer panel are capable of rotatably opening together or separately.

2. The gullwing door according to claim 1, wherein the outer panel and the inner panel each comprise a transparent window portion and an opaque portion, wherein the transparent window portion and the opaque portion of the outer panel and the inner panel are in alignment with each other.

3. The gullwing door according to claim 2, wherein the transparent window portion of at least one of the outer panel or the inner panel is capable of moving up and down within a frame of the opaque portion of the outer panel or the inner panel.

4. The gullwing door according to claim 1, wherein the inner panel comprises an opening disposed therein for entering/exiting the vehicle when the inner panel is in a closed position and the outer panel is in an open position.

5. The gullwing door according to claim 4, further comprising a protective piece capable of filling the opening in the inner panel when the opening is not in use.

6. The gullwing door according to claim 4, comprising a ring extending inward from the inner panel and surrounding the opening in the inner panel.

7. The gullwing door according to claim 1, wherein the first protective shell and the second protective shell each comprise a corrosion-resistant steel alloy or a composite material, wherein the protective shell is capable of at least one of substantially withstanding weapons fire or substantially withstanding fragmentation caused by explosion.

8. The gullwing door according to claim 7, wherein at least one of the first protective shell and the second protective shell further comprises a ballistic fiberglass or fabric liner.

9. The gullwing door according to claim 2, wherein the transparent window portion of the outer panel or inner panel of the gullwing door comprises one or more layers of polycarbonate.

10. The gullwing door according to claim 1, wherein the outer panel comprises a flat seal interface capable of providing a leak proof seal with a corresponding seal in a frame of the vehicle when the gullwing door is in a closed position.

11. The gullwing door according to claim 1, wherein when the outer panel is in an open position and the inner panel is in a closed position, the outer panel provides an awning over the inner panel.

12. A vehicle having at least one gullwing door mounted therein, wherein the at least one gullwing door comprises:
    an outer panel, wherein the outer panel is mountable in a vehicle at an upper edge of the outer panel, wherein the outer panel is lined with a first protective shell; and
    an inner panel disposed adjacent to the outer panel, wherein the inner panel comprises a second protective shell;
    wherein the inner panel and the outer panel are hinged together at an upper edge of the inner panel and the outer panel;
    wherein the inner panel and the outer panel are capable of opening together or separately.

13. The vehicle according to claim 12, further comprising protective armor installed in the roof and floor of the vehicle.

14. The vehicle according to claim 12, wherein the inner panel of the gullwing door comprises an opening disposed therein for entering/exiting the vehicle when the inner panel is in a closed position and the outer panel is in an open position.

15. The vehicle according to claim 14, further comprising a protective piece capable of filling the opening in the inner panel of the gullwing door when the opening is not in use.

16. The vehicle according to claim 14, wherein the inner panel comprises a ring extending inward from the inner panel and surrounding the opening in the inner panel.

17. The vehicle according to claim 12, wherein when the outer panel is in an open position and the inner panel is in a closed position, the outer panel provides an awning over the inner panel.

* * * * *